H. GRASMUK.
GUARD FOR BROOCH PIN TONGUES.
APPLICATION FILED APR. 19, 1910.
986,381.
Patented Mar. 7, 1911.
Fig. 1.
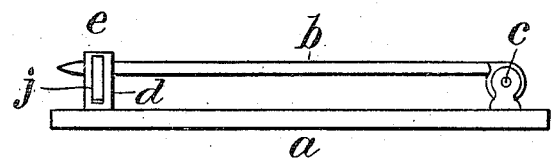
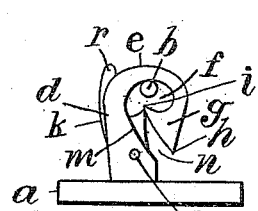
Fig. 2.
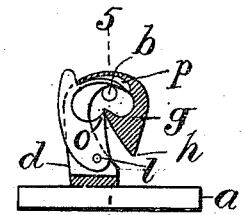
Fig. 3.
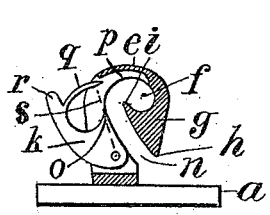
Fig. 4.
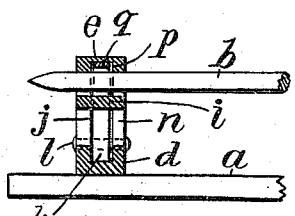
Fig. 5.
Witnesses
L. Lee.
J. Walter Greenbaum.
Inventor
Henry Grasmuk, per
Thomas S. Crane, Atty.

UNITED STATES PATENT OFFICE.

HENRY GRASMUK, OF EAST ORANGE, NEW JERSEY, ASSIGNOR TO THE FIRM OF BIPPART, GRISCOM & OSBORN, OF NEWARK, NEW JERSEY.

GUARD FOR BROOCH-PIN TONGUES.

986,381.  Specification of Letters Patent.  Patented Mar. 7, 1911.

Application filed April 19, 1910. Serial No. 556,335.

*To all whom it may concern:*

Be it known that I, HENRY GRASMUK, a citizen of the United States, residing at 43 Hampton Terrace, East Orange, county of Essex, and State of New Jersey, have invented certain new and useful Improvements in Guards for Brooch - Pin Tongues, fully described and represented in the following specification and the accompanying drawings, forming a part of the same.

The present invention relates to means for locking the pin-tongue of a brooch or similar article to prevent its accidental displacement from the hook of the pin-guard and the consequent loss of the brooch.

The invention embraces a hook of novel construction which in itself is well able to retain the pin-tongue unless the latter be subjected to pressure in a very peculiar manner, and I combine with such hook a swinging dog or catch which prevents the accidental escape of the pin-tongue from the guard, such dog being not only provided with a locking device to hold it from accidental displacement, but it is also so shaped that the movement of the pin-tongue to escape operates to press such dog into its operative position.

To retain the pin so far as possible within the guard-hook upon the top of the guard-post I form the guard-hook with a laterally expanded socket, from one end of which a sloping channel is extended toward the base of the post; the end of the guard-hook being provided with a triangular lug which forms one side of the sloping channel and which has a point reflexed into the socket at the upper end of the channel to throw the pin farther into the socket if accidentally pressed toward the foot of the post. As a further security for the retention of the tongue in the socket, I provide the guard-post with a dog pivoted near the base of the same and having a prong which extends across the channel in a direction oblique to the movement of the pin-tongue when escaping from the channel, the pin-tongue operating upon such inclined prong to press it more firmly into its operative position. The dog is provided with a thumb-piece for shifting it out of the channel to release the tongue; and to prevent any accidental shifting of the dog I recess the arch of the guard-hook with a space above the pin-tongue and form the upper end of the dog with an arched extension adapted to enter such recess and to crowd elastically against the inner side of the arch.

The invention will be understood by reference to the annexed drawing, in which—

Figure 1 is an edge view of a brooch provided with the improvement; Fig. 2 shows the end of the brooch with a view of the improved guard and the dog set across the channel; Fig. 3 is a similar view with the nearer side of the guard cut away to expose the dog; Fig. 4 is a view like Fig. 3, with the dog moved out of the channel; and Fig. 5 is a section on line 5—5 in Fig. 3, looking from the right hand side of Fig. 3.

The invention is applicable to brooches and objects of all kinds provided with a hinged pin, and Fig. 1 illustrates a flat brooch *a* having the pin *b* hinged thereon at *c* in the usual manner.

*d* represents the post of the pin-guard, *e* the arch of the hook which forms the socket *f*, the end of the hook having the triangular lug *g* provided with a lower point *h* and an upper point *i*. A slot *j* is shown in the post in Figs. 1 and 5, with a dog *k* hinged therein by a pin *l*. The side *m* of the post next to the triangular lug *g* is inclined toward the lug, from the socket *f* to the base of the post, and the opposed face of the lug *g* is made parallel with the inclined side of the post, forming a sloping channel *n* which extends into the inner end of the socket. The point *i* is reflexed upwardly into the socket *f* and the space between the arch *e* and the top of the point *i* is materially less than the width of the socket. The point *i* extends laterally past the middle line of the socket, upon which the pin-tongue *b* is naturally held by the curvature of the arch *e*, and when the tongue is accidentally pressed downward in the socket it therefore strikes the reflexed end of the point *i* and is crowded sidewise into the socket and away from the channel *n*.

The dog is furnished with a prong *o* which is extended across the channel *n* against the lug *g* and is set obliquely to the path of the tongue in such a manner that if the tongue is accidentally pressed into the top of the channel it operates upon the inclined side of the prong to press it firmly against the side of the lug *g*, thus holding the dog in its operative position instead of displacing it.

To hold the dog in its operative position, the arch *e* is formed in the top with a recess *p* extended from the top of the slot *j* over the top of the socket *f*, and the top of the dog *h* is formed with a curved spring *q* adapted to crowd elastically into such recess, and operating by the frictional engagement with the arch *e* to hold the dog from displacement. The top of the dog is provided with a thumb-piece *r* to move it out of the slot when required, as shown in Fig. 4; the extension or spring *q* at the top of the dog yielding sufficiently to slip from under the arch *e*. The parts are so small when actually applied to a brooch, that the yielding is almost imperceptible, as the extension is made to crowd into the recess beneath the top of the arch and is held therein by friction.

It will be noted particularly that the point *i* of the lug, which is reflexed into the socket *f*, leaves but little more space at that end of the socket than is necessary to move the pin intentionally from the socket into the top of the channel *n*, thus preventing the tendency of the pin to be thrown into the channel by any accidental movements. As the pin when pressed swings directly toward the brooch by connection with its hinge *c*, the movement brings it against the sloping top of the point *i* which throws it away from the channel, thus still further preventing any accidental removal of the pin from the socket.

In Fig. 4 a dotted line *s* is drawn from the pivot of the dog to the point of the prong *o*, showing that the point is materially inclined to such line and that pressure upon the sloping surface of the prong operates to press the dog sidewise and thus hold the prong more firmly in its operative position. This sloping arrangement of the prong is different from that of most locking devices which have been extended across the throat or channel of a pin-guard, as the operative face of such locking devices, which resist the movement of the pin-tongue, is usually at right angles to the path of the pin-tongue and to their hinged support, so that the pin-tongue has no tendency to crowd or hold them in a locked position.

Having thus set forth the nature of the invention what is claimed herein is:

1. In a brooch, a pin-guard having a post for securing it upon the brooch, said post having a sloping side and a slotted body as set forth, the guard having a laterally expanded socket, and a guard-hook provided with a triangular lug forming with the inclined side of the post a slanting channel extended from one side of the socket, and the lug having a point reflexed into the socket at the upper end of the channel, in combination with a dog hinged in the slotted post and having an upwardly inclined prong adapted to extend across the channel obliquely to the path of an escaping pin-tongue, whereby the movement of the pin-tongue downward in the channel presses the prong into its operative position.

2. In a brooch, a pin-guard having a post for securing it upon the brooch, said post having a sloping side and a longitudinal slot *j* therein as set forth, the guard-hook forming a laterally expanded socket *f* and a recess *p* extended across the top of the socket to the end of the longitudinal slot *j*, and having a lug forming with the post a slanting channel from one end of the socket, a dog hinged in the slot of the post, with a prong extended across the channel below the socket, and a curved spring upon the outer end of the dog fitted to the recess above the socket and adapted to elastically press the top of the recess when the prong is engaged with the channel.

In testimony whereof I have hereunto set my hand in the presence of two subscribing witnesses.

HENRY GRASMUK.

Witnesses:
 ALFRED P. HINTON,
 ERNEST W. WHITE.